United States Patent
Zhang et al.

(10) Patent No.: US 12,326,780 B2
(45) Date of Patent: Jun. 10, 2025

(54) BOOT PROCESS MONITORING

(71) Applicant: LENOVO GLOBAL TECHNOLOGY (UNITED STATES) INC., Morrisville, NC (US)

(72) Inventors: Caihong Zhang, Shanghai (CN); Fred Allison Bower, III, Durham, NC (US)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 47 days.

(21) Appl. No.: 18/331,393

(22) Filed: Jun. 8, 2023

(65) Prior Publication Data
US 2024/0362108 A1    Oct. 31, 2024

(51) Int. Cl.
| G06F 11/00 | (2006.01) |
| G06F 11/07 | (2006.01) |
| G06F 11/14 | (2006.01) |
| G06F 11/30 | (2006.01) |

(52) U.S. Cl.
CPC ...... *G06F 11/0793* (2013.01); *G06F 11/1417* (2013.01); *G06F 11/1438* (2013.01); *G06F 11/3075* (2013.01)

(58) Field of Classification Search
CPC .......... G06F 11/0751; G06F 11/0793; G06F 11/1417; G06F 11/1438; G06F 11/2294; G06F 9/4401; G06F 9/4406; G06F 9/4416
See application file for complete search history.

(56) References Cited

U.S. PATENT DOCUMENTS

| 6,629,240 B1 * | 9/2003 | Lee ........................ G06F 9/4403 713/1 |
| 8,583,963 B2 * | 11/2013 | Shao ................... G06F 11/0751 714/48 |
| 2005/0235049 A1 | 10/2005 | Liu |
| 2013/0198575 A1 * | 8/2013 | Etaati .................. G06F 11/3055 714/48 |
| 2017/0039100 A1 * | 2/2017 | Mashimo ............ G06F 11/0787 |
| 2017/0214591 A1 * | 7/2017 | Watanabe ........... G06F 11/0766 |
| 2019/0294490 A1 * | 9/2019 | Zhang ................. G06F 11/0793 |

FOREIGN PATENT DOCUMENTS

| CN | 102096982 A | 6/2011 |
| CN | 104572465 A | 4/2015 |
| CN | 105117252 A | 12/2015 |
| CN | 113419926 A | 9/2021 |
| CN | 115470056 A | 12/2022 |

OTHER PUBLICATIONS

Gwolter, ML model to predict timeouts, URL: https://ai.stackexchange.com/questions/35368/ml-model-to-predict-timeouts, date May 3, 2022, printed Jul. 13, 2022, 3 pages.
International Search Report and Written Opinion, PCT/CN2023/090758, mailed Jun. 23, 2023, 10 pages.

* cited by examiner

*Primary Examiner* — Marc Duncan

(57) ABSTRACT

Methods of boot process monitoring include receiving, by a service processor, a notice that a boot process for a server has started, monitoring a video buffer of a console of the server, and identifying, based on the monitoring, a potential error in the boot process.

17 Claims, 4 Drawing Sheets

BOOT PROCESS MONITORING

BACKGROUND

Field of the Disclosure

The field of the disclosure is data processing, or, more specifically, methods, apparatus, and products for boot process monitoring.

Description of Related Art

A boot process may encounter interruptions or errors, especially when booting from a network. For example, a server being booted into an operating system may wait a preset amount of time for receiving a boot file over the network and the boot process may subsequently timeout in response to the preset amount of time being exceeded. There are presently limited options for monitoring the status of a boot process, and such monitoring often requires an administrator to view data displayed on a console of the server. Such monitoring of boot processes may be burdensome, especially when deployment is occurring at scale.

SUMMARY

Methods, apparatus, and products for boot process monitoring according to various embodiments are disclosed in this specification. Boot process monitoring may include: receiving, by a service processor, a notice that a boot process for a server has started; monitoring a video buffer of a console of the server; and identifying, based on the monitoring, a potential error in the boot process.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
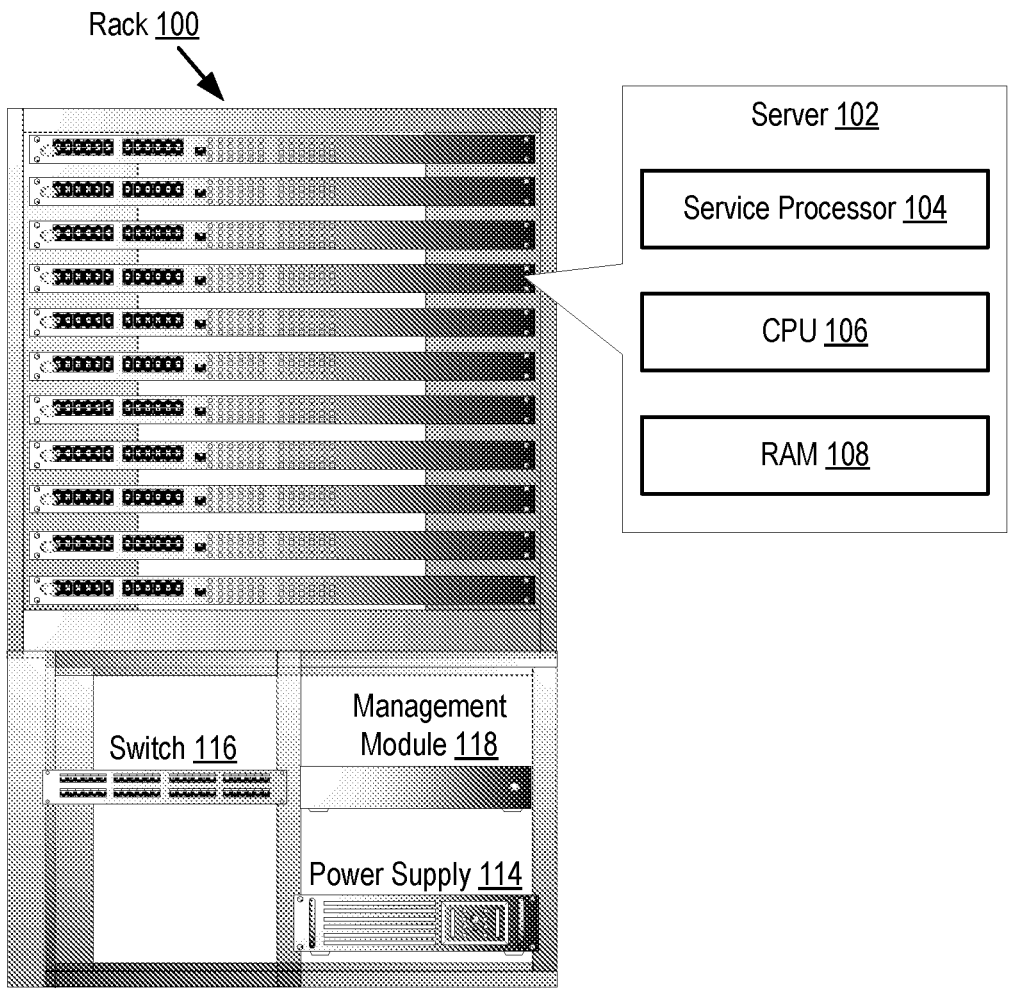
FIG. 1 shows an example line drawing of a system configured for boot process monitoring in accordance with embodiments of the present disclosure.

Exemplary methods, apparatus, and products for boot process monitoring in accordance with the present disclosure are described with reference to the accompanying drawings, beginning with FIG. 1. FIG. 1 sets forth an example line drawing of a rack mounted system configured for boot process monitoring in accordance with embodiments of the present disclosure. The example system of FIG. 1 includes a rack 100, such as a standard 19 inch rack for mounting multiple electronic equipment modules.

The example rack 100 of FIG. 1 includes a server 102, a power supply 114, a switch 116, and a management module 118. The server 102 includes a service processor 104, a central processing unit ('CPU') 106, and main computer memory in the form of RAM ('Random Access Memory') 108. The power supply 114 converts main AC power to low-voltage regulated DC power for the internal components of the rack 100. The switch 116 may be a network switch that connects components within the rack 100 to a computer network. The management module 118 provides system-management functions and is used for configuring and managing the installed components of the rack 100. For example, the management module 118 may configure the server 102 by causing the server to boot into an operating system.

The server 102 of FIG. 1 may be booted into an operating system by a bootloader, such as iPXE ('Preboot execution Environment'), which enables the server to boot from a network. Such a boot process relies on communications between servers over a network and may encounter interruptions or other errors. One example of an error that may occur during a boot process is a timeout. For example, during the iPXE boot process, the server 102 may wait a preset amount of time for receiving a boot file over the network and the boot process may subsequently timeout in response to the preset amount of time being exceeded. The status of the boot process may only be obtained by viewing data displayed on a console of the server. For example, in order to be made aware of an error in the boot process, an administrator would either have to monitor the console of the system for details about the progress of the boot process or wait for a timeout to occur and then investigate the status of the boot process by connecting to and inspecting the console. The console may be a viewed on a display coupled to the system or service processor of the system or may be a virtual console on the service processor of the server being booted. Such investigation or monitoring of boot processes may be burdensome, especially when deployment is occurring at scale.

The example server 102 is configured for boot process monitoring in accordance with embodiments of the present disclosure. In one embodiment, the server may be configured to monitor status information of the boot process on the console throughout the boot process and recognize when the status information indicates that a potential error may occur in the boot process. Once a potential error is detected, the server may notify the management module 118 of the potential error or perform remedial actions to help complete the boot process. The monitoring of the console may be performed by the service processor 104 and in response to receiving a notice from the management module 118 that the boot process has started.

Monitoring the console may include creating a time-lapse video recording of the console content during the boot process by recording images of the console content throughout the boot process. The service processor 104 may identify the potential error during the monitoring by interpreting the console content to determine the status of the boot process and recognize any signs of a potential error. The service processor 104 may be included within the server 102 or may be external to the server. Once the boot process is complete or is determined to need intervention, the recordings may be stored externally or retrieved by the management module 118 for future analysis and may be used to optimize data collection. For example, by analyzing a set of transcripts from a particular model of network adapter in a specific PXE network installation, the typical timing window for important PXE events can be determined and the service processor can be instructed to collect console images on a variable basis, thereby improving the performance of the time-lapse recording process. In another example, successful boot process recordings may be used to update expected boot times to optimize the time windows for recognizing when a boot process will likely timeout and halt. Similarly, successful boot process recordings may be used to identify phrases or strings of data to look for within the video buffer that may indicate a potential error will occur.

Utilizing console content recording as described in the present disclosure enables the communication of internal progress checkpoints from the boot process to the service processor, which is a communication channel that is not presently utilized in conventional UEFI ('Unified Extensible Firmware Interface') architecture. In conventional methods of booting a server into an operating system, the ROM ('Read-Only Memory') owns the PXE booting process and outputs to the console but does not communicate programmatically with the service processor directly.

The arrangement of servers and other devices making up the exemplary system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present disclosure may be implemented on a variety of hardware platforms in addition to those illustrated in FIG. 1.

Figure 2:
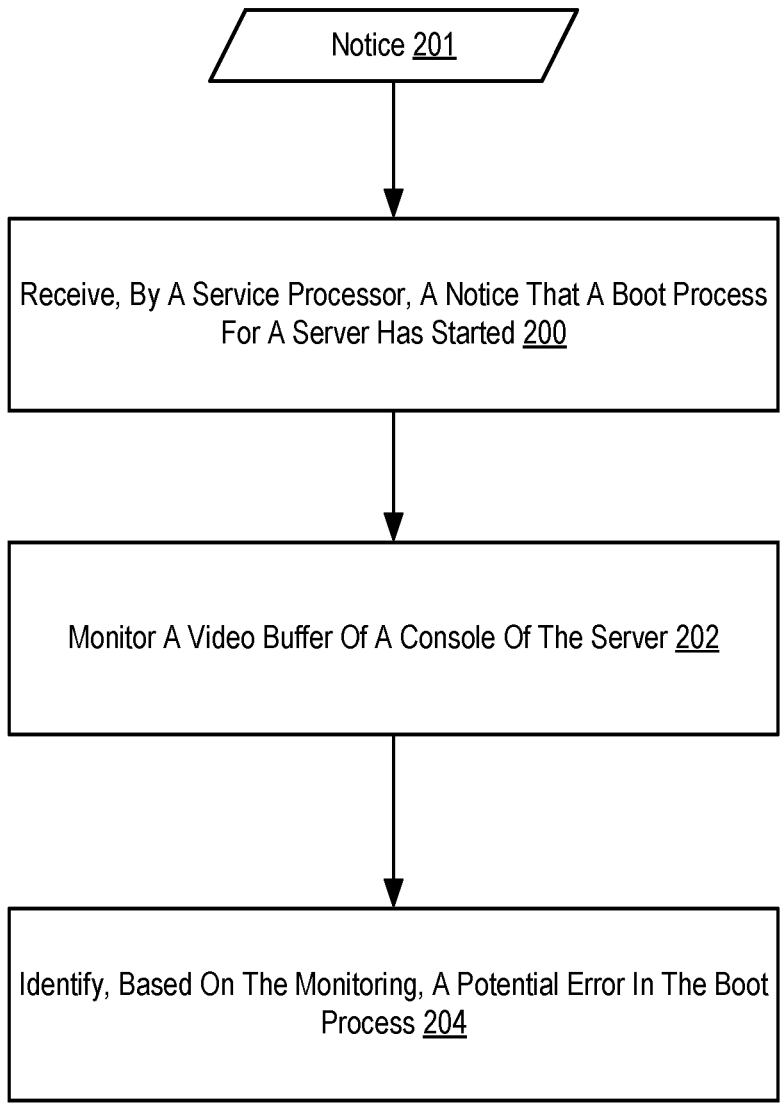
FIG. 2 is a flowchart of an example method for boot process monitoring according to some embodiments of the present disclosure.

For further explanation, FIG. 2 sets forth a flow chart illustrating an exemplary method of boot process monitoring according to embodiments of the present disclosure. The method of FIG. 2 includes receiving 200, by a service processor, a notice 201 that a boot process for a server has started. Receiving 200 a notice 201 that a boot process for a server has started may be carried out by the service processor receiving a data packet over a network including information regarding the start of a boot process specific to the server. The notice 201 may be received from the server itself, such as by the server firmware, or by the management module 118 and may include data identifying the server, the type of boot process that has started, and the like. The boot process may be carried out by a bootloader such as iPXE for booting the server into an operating system from a network.

The method of FIG. 2 also includes monitoring 202 a video buffer of a console of the server. In one example, the console may be viewed on a display device physically coupled to the server for displaying boot process status information. In another example, the console may be a virtual console hosted by the service processor, where the virtual console is accessible only by the service processor for viewing status information of the boot process (or via a remote management module). The video buffer is a portion of memory for storing data representing the content to be displayed on the console. The video buffer may be included as part of the RAM 108 of the server or may be included in memory separate from the RAM. Monitoring 202 a video buffer of a console of the server may be carried out by the service processor analyzing data stored within the video buffer that represents the content to be displayed on the console, such as status information of the boot process for the server.

The method of FIG. 2 also includes identifying 204, based on the monitoring 202, a potential error in the boot process. Identifying 204 a potential error in the boot process may be carried out by the server or service processor performing a process for extracting information on the status of the boot process from the data being monitored from within the video buffer. A potential error may include an interruption or halt of the boot process, such as one caused by a timeout that occurs during the boot process. For example, the boot process may timeout after a period of time when trying to connect to the network, or when attempting to download the operating system installer, which may prevent the boot process from completing. Such a timeout may be identified by the service processor when monitoring the video buffer of the console by identifying status information indicating such an error or timeout has occurred. The potential error may also be identified prior to occurring. For example, a timeout may be set to occur after a 3 minute period has elapsed during the boot process, and it may be known that a server almost always successfully boots within 40 seconds. In such an example, the service processor may identify, based on monitoring the video buffer of the console, that a timeout or potential error will likely occur once the boot process has exceeded a time threshold, such as 1 minute. Such a time threshold may be preselected or based on previously known boot times. Identifying a potential error in the boot process may be performed automatically by the service processor without a user viewing any status information. For example, the service processor may identify the potential error, when monitoring a virtual console, prior to the error occurring and without any user ever viewing the console.

Figure 3:
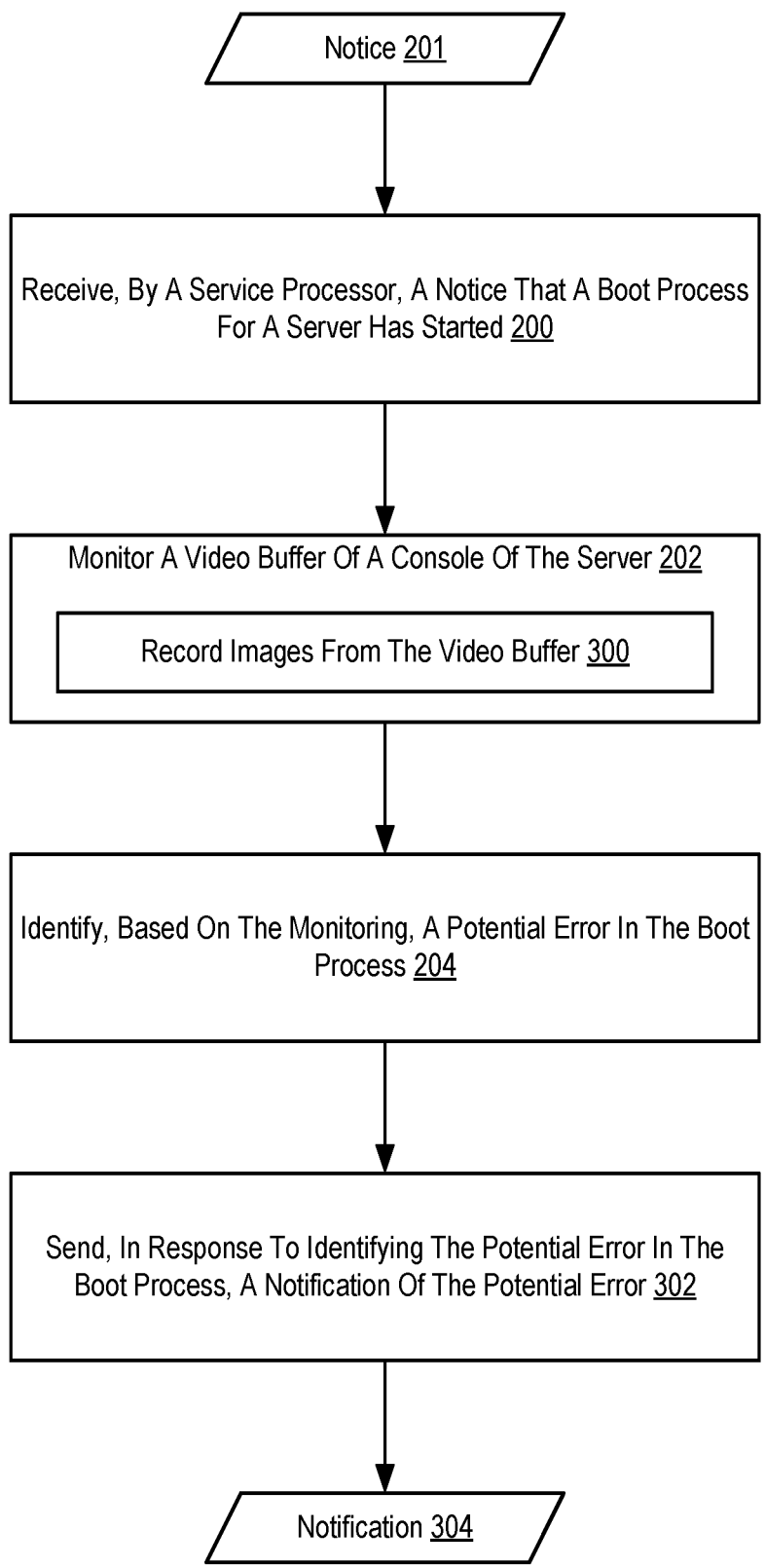
FIG. 3 is a flowchart of an example method for boot process monitoring according to some embodiments of the present disclosure.

For further explanation, FIG. 3 sets forth a flowchart illustrating an example method of boot process monitoring according to embodiments of the present disclosure. The method of FIG. 3 continues with the method of FIG. 2 by further including, as part of monitoring 202 a video buffer of a console of the server, recording 300 images from the video buffer. Recording images from the video buffer may be carried out by the service processor storing snapshots of images to be displayed on the console converted from the data included within the video buffer. In an example where the console is a physical console, the service processor may record snapshots of the content displayed on the console. In an example where the console is a virtual console, the service processor may sample the data included within the video buffer representing the data to be displayed on the virtual console. The recording may include snapshots of the video buffer content taken periodically, where the rate of snapshots recorded is determined based on a preset value or historical data on previous boot processes. In another embodiment, the snapshots may be taken dynamically based on the data within the video buffer. The recording of the images may be triggered by the notice of the start of the boot process, or the recording of images may begin after a preset delay after the boot process has started. In another embodiment, the recording of the images may be triggered by the service processor based on identifying specific code within the video buffer or identifying that a particular step has been reached within the boot process. The recorded images may be stored locally within memory of the service processor or may be stored in memory external to the service processor.

The method of FIG. 3 also includes sending 302, in response to identifying 204 the potential error in the boot process, a notification of the potential error. Sending 302 a notification 304 of the potential error may be carried out by the service processor 104 sending a notification 304 of the potential error to the management module 118 over a network. The notification 304 may include information describing the type of error, the step in the boot process at which the error was identified, potential remedial actions that may be performed in response to the potential error, and the like. The notification may also include recorded images from the video buffer showing the status information on the console. The notification may also include a copy of the recorded timelapse of the entire boot process up to the point when the potential error was identified. The notification may be sent by the service processor prior to the error actually occurring.

Figure 4:
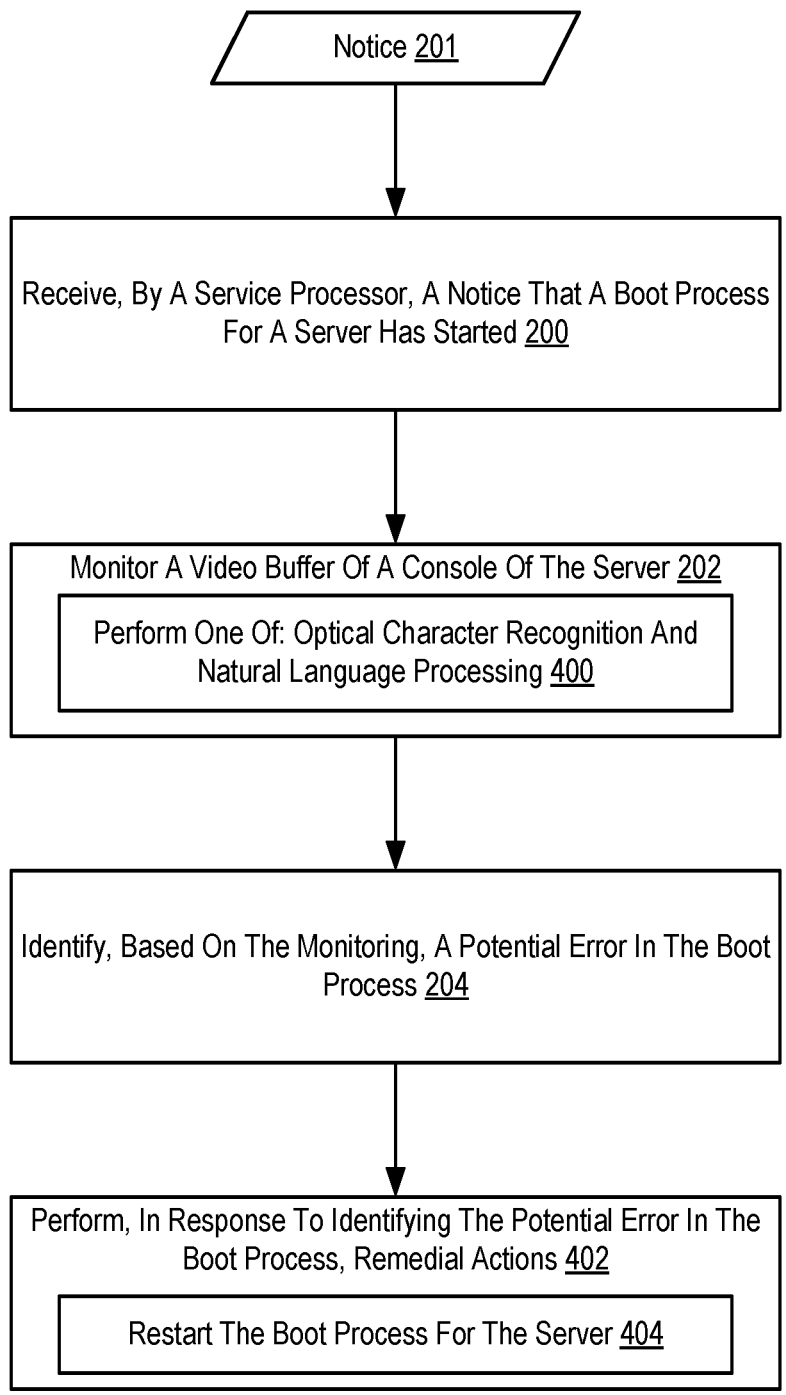
FIG. 4 is a flowchart of an example method for boot process monitoring according to some embodiments of the present disclosure.

For further explanation, FIG. 4 sets forth a flowchart illustrating an example method of boot process monitoring according to embodiments of the present disclosure. The method of FIG. 4 continues with the method of FIG. 2 by further including, as part of monitoring 202 a video buffer of a console of the server, performing 400 one of: optical character recognition and natural language processing. Monitoring 202 a video buffer of a console of the server may be carried out by the service processor performing a process, such as optical character recognition, natural language processing, or the like, to analyze video buffer data representing the content to be displayed on the console, such as status information of the boot process.

The method of FIG. 4 also includes performing 402, in response to identifying 204 the potential error in the boot process, remedial actions. Performing 402 remedial actions may be carried out by the service processor determining actions that may prevent the potential error from occurring or that may allow the boot process to be completed. An example of a remedial action may be restarting 404 the boot process for the server. The remedial actions may be performed automatically by the service processor and prior to the potential error actually occurring. For example, a timeout may be set to occur after a 5 minute period has elapsed during the boot process, and it may be known that a server almost always successfully boots within 1 minute. In such an example, the service processor may identify, based on monitoring the video buffer of the console, that a timeout or potential error will likely occur once the boot process has exceeded a time threshold, such as 2 minutes. In such an example, in response to identifying the potential error, the service processor may automatically perform remedial actions, such as restarting the boot process, prior to the error occurring and without any user viewing the console.

In view of the explanations set forth above, readers will recognize that the benefits of boot process monitoring according to embodiments of the present disclosure include:
Improving system boot efficiency by responding to boot errors automatically and before they even occur.
Improving boot process management by alerting management of potential errors before they occur.

Exemplary embodiments of the present disclosure are described largely in the context of a fully functional computer system for dynamic buffer selection in ethernet controllers. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of boot process monitoring comprising:
receiving, by a service processor, a notice that a boot process performed by a bootloader for a server has started;
monitoring, during the boot process and by the service processor, a video buffer of a console of the server, wherein the video buffer includes memory that stores data representative of content to be displayed via the console, and wherein the memory is accessible by both the service processor and the bootloader;
identifying, by the service processor and during a first time window of the boot process and based on the monitoring of the video buffer, that a potential error will occur in a second time window of the boot process, the second time window of the boot process after the first time window; and
performing, by the service processor, a remedial action to prevent the potential error from occurring.

2. The method of claim 1, wherein monitoring the video buffer includes recording images from the video buffer by converting the data included the video buffer into an image snapshot.

3. The method of claim 2, further comprising transmitting, by the service processor and in response to identifying the potential error in the boot process, a notification of the potential error to a management module separate from the server.

4. The method of claim 3, wherein the notification includes an image from the recording of the video buffer.

5. The method of claim 2, wherein the recording is triggered based on identifying specific code during the monitoring of the video buffer.

6. The method of claim 1, wherein performing the remedial actions include restarting the boot process for the server.

7. The method of claim 1, wherein monitoring the video buffer includes performing one of identifying characters using optical character recognition and natural language processing.

8. An apparatus for boot process monitoring, the apparatus comprising a service processor, a computer memory operatively coupled to the service processor, the computer memory having therein computer program instructions that are configured to, when executed by the computer processor, cause the apparatus to perform operations comprising:
receiving a notice that a boot process performed by a bootloader for a server has started;
monitoring, during the boot process and by the service processor, a video buffer of a console of the server, wherein the video buffer includes memory that stores data representative of content to be displayed via the console, and wherein the memory is accessible by both the service processor and the bootloader;

identifying, by the service processor and during a first time window of the boot process and based on the monitoring of the video buffer, that a potential error will occur in a second time window of the boot process, the second time window of the boot process after the first time window; and performing, by the service processor, a remedial action to prevent the potential error from occurring.

9. The apparatus of claim 8, wherein the computer program instructions that cause the apparatus to perform monitoring of the video buffer further cause the apparatus to perform recording images from the video buffer, and wherein the console is a virtual console hosted by the computer processor.

10. The apparatus of claim 9, further comprising sending, in response to identifying the potential error in the boot process, a notification of the potential error, wherein the virtual console is accessible only by the service processor, and wherein identifying the potential error is performed without the console being accessible to a user.

11. The apparatus of claim 9, wherein the recording is triggered based on identifying specific code during the monitoring of the video buffer.

12. The apparatus of claim 8, further comprising, in response to identifying the potential error in the boot process, performing remedial actions.

13. The apparatus of claim 12, wherein the remedial actions include restarting the boot process for the server.

14. A computer program product comprising a non-volatile computer readable storage medium and computer program instructions stored therein that are configured to, when executed by a processor, cause a computer to perform operations comprising:

receiving a notice that a boot process performed by a bootloader for a server has started;

monitoring, during the boot process and by the service processor, a video buffer of a console of the server, wherein the video buffer includes memory that stores data representative of content to be displayed via the console, and wherein the memory is accessible by both the service processor and the bootloader;

identifying, by the service processor and during a first time window of the boot process and based on the monitoring of the video buffer, that a potential error will occur in a second time window of the boot process, the second time window of the boot process after the first time window; and performing, by the service processor, a remedial action to prevent the potential error from occurring.

15. The computer program product of claim 14, wherein monitoring the video buffer includes recording images from the video buffer.

16. The computer program product of claim 15, further comprising sending, in response to identifying the potential error in the boot process, a notification of the potential error.

17. The computer program product of claim 14, further comprising, in response to identifying the potential error in the boot process, performing remedial actions.

* * * * *